(12) United States Patent
Ryu et al.

(10) Patent No.: US 8,934,761 B2
(45) Date of Patent: *Jan. 13, 2015

(54) RANDOMLY ACCESSIBLE VISUAL INFORMATION RECORDING MEDIUM AND RECORDING METHOD, AND REPRODUCING DEVICE AND REPRODUCING METHOD

(71) Applicant: Mitsubishi Denki Kabushiki Kaisha, Tokyo (JP)

(72) Inventors: Tomoaki Ryu, Tokyo (JP); Kazuhiko Nakane, Tokyo (JP); Masaaki Shimada, Tokyo (JP); Yoshihisa Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,474

(22) Filed: Oct. 22, 2013

(65) Prior Publication Data

US 2014/0044418 A1 Feb. 13, 2014

Related U.S. Application Data

(63) Continuation of application No. 14/047,826, filed on Oct. 7, 2013, now Pat. No. 8,824,869, which is a continuation of application No. 12/899,893, filed on Oct. 7, 2010, now Pat. No. 8,606,086, which is a
(Continued)

(30) Foreign Application Priority Data

| Jul. 1, 2004 | (JP) | 2004-195476 |
|---|---|---|
| Jul. 12, 2004 | (JP) | 2004-205250 |
| Jul. 22, 2004 | (JP) | 2004-214080 |
| Aug. 5, 2004 | (JP) | 2004-229683 |
| Aug. 18, 2004 | (JP) | 2004-238482 |

(51) Int. Cl.
*H04N 5/917* (2006.01)
*H04N 5/92* (2006.01)

(52) U.S. Cl.
USPC ............................................. 386/326; 386/328

(58) Field of Classification Search
USPC .......... 386/241, 326, 328, 329, 330, 331, 332
See application file for complete search history.

(56) References Cited

U.S. PATENT DOCUMENTS 5,140,437 A 8/1992 Yonemitsu et al.
5,377,051 A * 12/1994 Lane et al. .................... 386/314
(Continued)

FOREIGN PATENT DOCUMENTS

| EP | 1388862 A1 | 2/2004 |
|---|---|---|
| JP | 8-45249 A | 2/1996 |

(Continued)

OTHER PUBLICATIONS

Foreign Office Action of JP 2013-053786 dated Oct. 8, 2013.
(Continued)

*Primary Examiner* — Robert Chevalier
(74) *Attorney, Agent, or Firm* — Birch, Stewart, Kolasch & Birch, LLP

(57) ABSTRACT

Access point pictures designated as randomly accessible positions are I pictures or P pictures. Information indicating the decoding sequence (I1, P1, B1, B2, B3, B4, P2, . . . ) of pictures functioning as access points and attribute information (picture_type) indicating whether a picture functions as an access point or is necessary for decoding of the access point following a given access point are recorded on the video information recording medium. Random access is possible even if the GOP interval is lengthened.

2 Claims, 16 Drawing Sheets

```
Entry_map( ) {
    number_of_IAP
    for (IAP_id=0 ; IAP_id<number_of_IAP ; IAP_id++) {
        I_PTS_AP[IAP_id]
        I_SCN_AP[IAP_id]
        Size_of_IAP[IAP_id]
        number_of_PAP[IAP_id]
        for (PAP_id=0 ; PAP_id<number_of_PAP ; PAP_id++) {
            P_PTS_AP[IAP_id][PAP_id]
            P_SCN_AP[IAP_id][PAP_id]
            Size_of_PAP[IAP_id][PAP_id]
        }
    }
}
```

Related U.S. Application Data continuation of application No. 11/978,570, filed on Oct. 30, 2007, now Pat. No. 7,835,628, which is a continuation of application No. 10/569,603, filed as application No. PCT/JP2005/011342 on Jun. 21, 2005, now Pat. No. 7,706,668.

(56) References Cited

U.S. PATENT DOCUMENTS

| | | |
|---|---|---|
| 2002/0041758 A1 | 4/2002 | Seki et al. |
| 2004/0071354 A1 | 4/2004 | Adachi et al. |
| 2005/0008328 A1 | 1/2005 | Kawa et al. |
| 2006/0291807 A1 | 12/2006 | Ryu et al. |

FOREIGN PATENT DOCUMENTS

| | | |
|---|---|---|
| JP | 8-273304 A | 10/1996 |
| JP | 9-46712 | 2/1997 |
| JP | 9-98430 A | 4/1997 |
| JP | 2001-285877 A | 10/2001 |
| JP | 2003-319340 A | 11/2003 |
| JP | 2004-187264 A | 7/2004 |
| JP | 2005-12390 A | 1/2005 |
| JP | 2011-147158 A | 7/2011 |
| JP | 2013-236384 A | 11/2013 |
| JP | 5414932 B2 | 11/2013 |
| WO | WO 97/30544 A2 | 8/1997 |
| WO | WO 02/25949 A2 | 3/2002 |

OTHER PUBLICATIONS

Karczewicz et al., "The SP- and SI-Frames Design for H.264/AVC", IEEE Transactions on Circuits and Systems for Video Technology, vol. 13, No. 7, pp. 637-644, Jul. 2003, XP011099256.

Tudor, "MPEG-2 video compression", Electronics & Communication Engineering Journal, Dec. 1995, pp. 257-264, XP000567277.

* cited by examiner

FIG.3

```
Entry_map ( ) {
    number_of_IAP
    for (IAP_id=0 ;  IAP_id<number_of_IAP ;  IAP_id++) {
        I_PTS_AP[IAP_id]
        I_SCN_AP[IAP_id]
        Size_of_IAP[IAP_id]
        number_of_PAP[IAP_id]
        for (PAP_id=0 ;  PAP_id<number_of_PAP ;  PAP_id++) {
            P_PTS_AP[IAP_id][PAP_id]
            P_SCN_AP[IAP_id][PAP_id]
            Size_of_PAP[IAP_id][PAP_id]
        }
    }
}
```

FIG.6

```
Entry_map ( ) {
    number_of_IAP
    for (IAP_id=0 ;  IAP_id<number_of_IAP ;  IAP_id++) {
        I_PTS_AP [IAP_id]
        I_SCN_AP [IAP_id]
        Size_of_IAP [IAP_id]
        number_of_PAP [IAP_id]
        for (PAP_id=0 ;  PAP_id<number_of_PAP ;  PAP_id++) {
            frame_num [IAP_id] [PAP_id]
            P_SCN_AP [IAP_id] [PAP_id]
            Size_of_PAP [IAP_id] [PAP_id]
        }
    }
}
```

FIG.10

```
GOP_access_info ( ) {
    ref_IAP_id
    number_of_P_picture in GOP
    for (i = = 0 ; < number_of_P_picture ;  i++) {
        frame_num
        picture_type
        if (picture_type = 2) P_SCN_AP
    }
}
```

FIG.11

```
GOP_access_info {
    ref_IAP_id
    number_of_PAP
    for (PAP_id = 0 ;  PAP_id < number_of_PAP ;  PAP_id++) {
        P_PTS_AP [PAP_id]
        P_SCN_AP [PAP_id]
        number_of_P_pictures [PAP_id]
        for (P_id = 1 ;  P_id < number_of_P_pictures ;  P_id++) {
            picture_type [PAP_id] [P_id]
        }
    }
}
```

FIG.12

```
Entry_map ( ) {
    number_of_IAP
    for (IAP_id=0 ;  IAP_id<number_of_IAP ;  IAP_id++ ) {
        I_PTS_AP [IAP_id]
        SEI_SCN_AP [IAP_id]
        Size_of_IAP [IAP_id]
    }
}
```

FIG.14

```
GOP_strucutre {
    number_of_GOP
    for(GOP_id=0 ; GOP_id<number_of_GOP ; GOP_id++)
        GOP_PTS [GOP_id]
        number_of_pictures [GOP_id]
        for (picture_id=1 ; picture_id<number_of_pictures ; picture_id++) {
            decode_order[GOP_id] [picutre_id]
        }
    }
}
```

FIG.17

```
Entry_map ( ) {
    number_of_IAP
    for (IAP_id=0 ;  IAP_id<number_of_IAP ;  IAP_id++) {
        I_PTS_AP [IAP_id]
        I_SCN_AP [IAP_id]
        Size_of_IAP [IAP_id]
        number_of_PAP [IAP_id]
        number_of_P_picture [IAP_id]
        for (P_id=0 ;  P_id<number_of_P_picture ;  P_id++) {
            attribute [IAP_id] [P_id]
        }
        for (PAP_id=0 ;  PAP_id<number_of_PAP ;  PAP_id++) {
            P_PTS_AP [IAP_id] [PAP_id]
            P_SCN_AP [IAP_id] [PAP_id]
            Size_of_PAP [IAP_id] [PAP_id]
            number_of_P_picture [IAP_id] [PAP_id]
            for (P_id=0 ;  P_id<number_of_P_picture ;  P_id++) {
                attribute [IAP_id] [PAP_id] [P_id]
            }
        }
    }
}
```

RANDOMLY ACCESSIBLE VISUAL INFORMATION RECORDING MEDIUM AND RECORDING METHOD, AND REPRODUCING DEVICE AND REPRODUCING METHOD

This application is a Continuation of co-pending application Ser. No. 14/047,826 filed on Oct. 7, 2013 which is a Continuation of co-pending application Ser. No. 12/899,893 filed on Oct. 7, 2010 which is a Continuation of Ser. No. 11/978,570 filed on Oct. 30, 2007, now U.S. Pat. No. 7,835,628 which is a Continuation of co-pending application Ser. No. 10/569,603, filed on Feb. 24, 2006, now U.S. Pat. No. 7,706,668 and for which priority is claimed under 35 U.S.C. §120. application Ser. No. 10/569,603 is the national phase of PCT International Application No. PCT/JP2005/11342 filed on Jun. 21, 2005 under 35 U.S.C. §371. This application claims priority of Application Nos. 2004-195476, 2004-205250, 2004-214080, 2004-229683, and 2004-238482 all filed in Japan on Jul. 1, 2004, Jul. 12, 2004, Jul. 22, 2004, Aug. 5, 2004, and Aug. 18, 2004, respectively, under 35 U.S.C. §119; the entire contents of all are hereby incorporated by reference.

FIELD OF THE INVENTION

The present invention relates to a randomly accessible video information recording medium, a recording device for recording video data on a video information recording medium, the recording method, a reproducing device for reproducing video data from a randomly accessible video information recording medium, and the reproducing method.

BACKGROUND ART

A proposed system for writing encoded image data in packets formatted according to the MPEG system on a storage medium to enable trick reproduction of image data by a simple and efficient method without increasing the capacity of the storage medium is to set up an I picture index of packets in which at least part of the I picture data is stored and, during trick reproduction, to read only the packets on which the I picture index is set (for example, Patent Document No. 1).
Patent Document No. 1: Japanese Patent Application Publication No. H9-98430 (pp. 4-10, FIGS. 1-15)

DISCLOSURE OF THE INVENTION

Problems to be Solved by the Invention

In recent years, MPEG4-AVC (H.264) and other new encoding methods by which even low-bit-rate encoding can provide adequate image quality have come into use. To obtain high image quality with a low bit rate, it is necessary to minimize the number of intra-coded (I) pictures, which require relatively much encoded data.

Because the first frame in a group of pictures (GOP) must be an I picture, reducing the number of I pictures is equivalent to increasing the GOP length. For example, a 1-seg broadcast, which is a television broadcast for mobile terminals, allows up to a five-second GOP length. If the GOP length is increased in this manner, the number of positions that can be designated as access points for random access is greatly reduced, because random access must start from an I picture, which can be decoded without reference to other frames. In a time search etc. of a video image recorded by a user, accordingly, because the only positions designated as accessible points are the I pictures at which GOPs begin, although the user may want to reproduce the image starting from a certain point in time, access to precisely that point of time may be difficult; to the user's inconvenience, it may only be possible to reproduce the image starting from a time offset from the desired point in time. Another problem is that if the GOP length is set to five seconds, for example, in random access to a point within that interval, in the worst case more than two seconds passes before the desired picture is reproduced.

The present invention addresses the above problems, with the object of providing a video information recording medium, a video information recording apparatus and recording method, and a reproducing apparatus and reproducing method with which random access is possible even if the GOP length is increased.

Means of Solution of the Problems

This invention is a video information recording medium on which are recorded video data organized into video units including intra-coded (I) pictures coded intra-frame, predictive coded (P) pictures each including a group of blocks predicted from one frame, and bidirectionally predictive coded (B) pictures each including a group of blocks predicted from two frames, the video information recording medium being randomly accessible and having disposed thereon information indicating a decoding sequence of pictures designated as randomly accessible positions and thus functioning as access points, and attribute information indicating whether a picture functions as an access point or is necessary for decoding of the access point following a given access point.

Effect of the Invention

According to this invention, video reproduction can be carried out smoothly from the point in time desired by the user even if the GOP length is increased, and random access is possible.

BRIEF DESCRIPTION OF THE DRAWINGS

FIG. 3 illustrates the structure of index information for accessing a P picture used as an access point.

FIG. 6 illustrates the structure of index information for accessing a P picture used as an access point in a second embodiment.

FIG. 10 illustrates the structure of GOP_access_info, which describes access information in each GOP in the third embodiment.

FIG. 11 illustrates another example of the structure of the GOP_access_info describing access information in each GOP in the third embodiment.

FIG. 12 illustrates the structure of index information for accessing a P picture used as an access point in the third embodiment.

FIG. 14 illustrates the structure of GOP_structure( ) in the fourth embodiment.

FIG. 17 illustrates the structure of index information supporting random access and fast-forward reproduction in the fifth embodiment.

EXPLANATION OF REFERENCE CHARACTERS

AP, AP1, AP2 access points, 1 navigation data, 2 video data, 3 video file, 4 GOP(k) 100, 120 reproducing device, 101 user interface, 102 CPU, 103 drive, 104 drive controller, 105 work memory, 106 system bus, 107 decoder, 108 buffer memory, 109 display device, 110 picture selector

BEST MODE OF PRACTICING THE INVENTION

Embodiments of the invention will now be described with reference to the attached drawings.

The embodiments illustrate mainly the case in which the video information recording medium is an optical disc, but it may be another recording medium such as a hard disc or semiconductor memory.

These embodiments will be described for the case in which a 30 frames per second picture is compressed to digital video data by the MPEG4-AVC (Advanced Video Codec) encoding system. Each frame of digital video data consists of one of three types of coded picture: an I picture, a P picture, or a B picture. An I picture is an intra-coded picture coded within one frame. A P picture is a predictive coded picture; one frame is divided into a group of blocks, each block being predicted from one other frame; that is, a P picture is a group of blocks predicted from one frame. A B picture is also a predictive coded picture in which one frame is divided into a group of blocks, but each block is predicted with reference to two other frames; that is, a B picture is a group of blocks predicted from two frames. A group of pictures (GOP) is structured as a unit comprising at least one I picture followed by one or more P pictures and one or more B pictures, and the video data consist of a plurality of such GOPs. The MPEG4-AVC standard provides no definition of GOPs, but the term GOP will be used herein to denote this concept as applied to MPEG4-AVC, and the following description will assume that the length of a GOP is 1.0 second.

First Embodiment

Figure 1A:
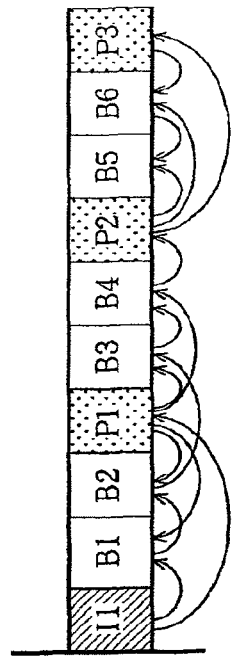
FIG. 1(a) and FIG. 1(b) are diagrams illustrating the structure of a GOP according to the first embodiment.
Figure 1B:
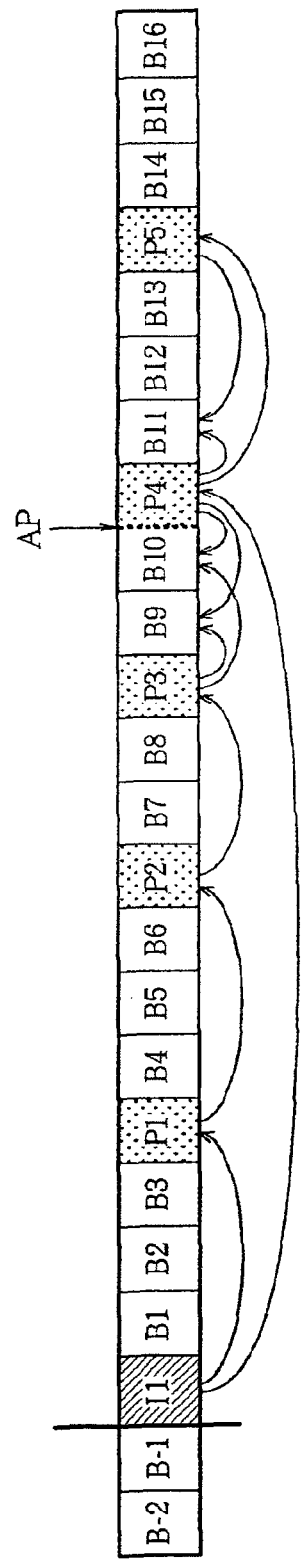

FIG. 1(a) and FIG. 1(b) are diagrams illustrating the structure of a GOP. In these figures, I represents an I picture, P represents a P picture, and B represents a B picture. The leftmost picture I1 is the oldest picture, and subsequent pictures are arranged temporally from left to right in their presentation sequence. In the figures, arrows represent predictive and referencing encoding relationships among the pictures. The numbers after the letters I, P, and B are picture identification numbers, given in temporal sequence.

FIG. 1(a) is an example of the MPEG4-AVC coded GOP structure. How the pictures are decoded will be described with reference to FIG. 1(a). The pictures are displayed in the order shown in the figure, but are recorded on a recording or other medium in the decoding sequence, such as in the order of I1, P1, B1, B2, B3, B4, P2 ... in FIG. 1(a), for example.

In FIG. 1(a), I1 is an independently decodable picture, and because it is the first picture, it is decoded first. The decoded I picture is necessary for later decoding, so it is temporarily stored in a frame memory in the decoder. Next, P1 is decoded, and the decoded P picture is also temporarily stored in the frame memory. Then B1 is decoded with reference to I1 and P1, which are already decoded, and is temporarily stored in the frame memory. I1 is deleted from the frame memory at this time. Next B2 is decoded with reference to B1 and P1, and is temporarily stored in the frame memory. B3 is decoded with reference to P1 and B2 and is temporarily stored in the frame memory, but is then deleted from the frame memory. B4 is decoded with reference to P1 and B3 and is temporarily stored in the frame memory, and all the pictures in the frame memory except B4 are discarded. Next P2, which is predicted from B4, is decoded and temporarily stored in the frame memory. Decoding proceeds in a similar manner.

As described above, to decode one picture, a temporally preceding picture and/or a following picture is necessary, which poses a significant problem for random access. Consider P2: in order to decode P2, B4 is necessary, and in order to decode B4, B3, and P1 are necessary. In order to decode B3, P1, and B2 are necessary, and in order to decode B2, B1, and P1 are necessary. In order to decode B1, I1, and P1 are necessary. Therefore, if one wants to start reproducing from P2, one finds that P2 can be decoded only after decoding all of pictures I1, B1, B2, P1, B3, and B4. (In MPEG2, which, unlike MPEG4-AVC, does not permit the pictures used for reference and prediction to be selected arbitrarily, P2 could be decoded and reproduced by decoding I1 and P1.) This means that a picture encoded by MPEG4-AVC lacks random accessibility. In low-bit-rate encoding, the GOP length tends to be set high in order to improve the coding efficiency. If, for example, the length of a GOP is about five seconds, then in random access to a picture in the interior of the GOP, in the worst case, more than two seconds passes before the desired picture is reproduced.

Therefore, in an encoding scheme such as MPEG4-AVC which allows arbitrary selection of the pictures used for reference and prediction, many pictures have to be decoded in order to access a picture in the interior of a GOP, and time is necessary before reproduction begins. As a result, problems arise in starting reproduction from the point desired by the user: it may take time for reproduction to begin, or reproduction may start from a point different than the desired point.

To solve these problems, it is necessary to add some constraints on encoding. Adding strong constraints, however, would weaken the advantages of MPEG4-AVC, so the constraints should be minimized. FIG. 1(b) shows the structure of a GOP in which a picture to be used as an access point (AP) has been coded with certain constraints. The pictures are arranged in their presentation sequence from left to right. For this GOP, the following three constraints are added as conditions for coding pictures following the access point AP:

1. A picture used as an access point AP must be an I or P picture;
2. A P picture used as an access point AP must always be predicted from the initial I picture of the GOP; and
3. Pictures following a P picture used as an access point AP must not be predicted or referenced from pictures preceding the access point AP, other than the initial I picture of the GOP.

An access point AP is a position (point) accessible in random access reproduction, in which reproduction starts from an arbitrary point in the video information, e.g., a point desired by the user. For a read-only optical disc, these points are designated at the time of authoring of the disc, while for a recordable or rewritable optical disc, the points are designated by the recording device when it records video data on the disc.

In FIG. 1(b), in order to start reproduction from P4, which is an access point AP, all that is necessary is to decode I1 at the start of the GOP, and then decode P4. Pictures following P4 do not use pictures preceding P4 for reference or prediction, so subsequent pictures can be reproduced continuously by decoding them in the usual sequence.

When encoding is carried out with the above constraints, in order to start reproduction from P4, which is an access point AP, it is only necessary to read and decode the data of I1 at the start of the GOP; it is not necessary to read or decode other pictures preceding P4. Let it be assumed that the disc read-out rate is 10 Mbps, the coding rate is 10 Mbps, the coding ratio of I pictures to B pictures to P pictures is 10:6:1, and the seek time is 100 msec. In this case, the total data size of I1 and P4 will be about 1.3 Mbits under the above conditions, and the time necessary to read out all this data will be 130 msec. After reading I1, an additional 100 msec is needed to access P4, so about 230 msec will be necessary in all.

Figure 2:
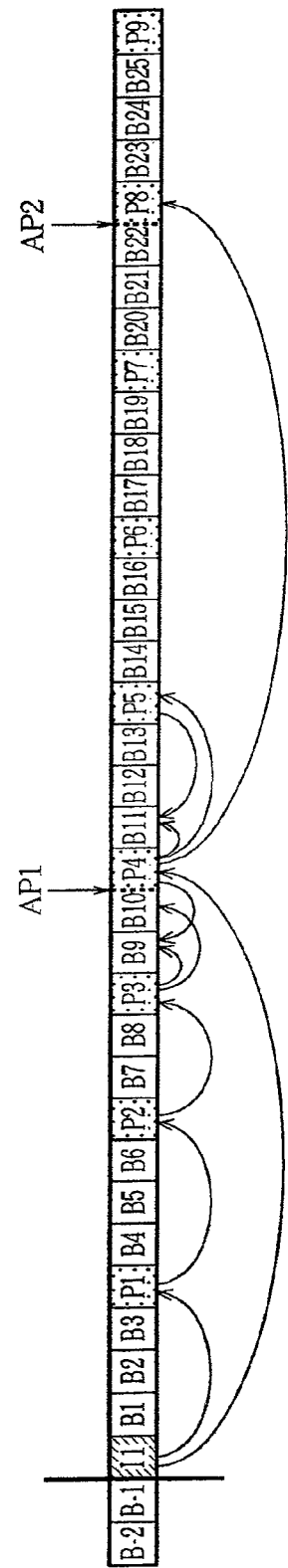
FIG. 2 shows an example of the GOP structure when two P picture access points are set in one GOP.

The above discussion deals with a case in which there is a single P picture access point AP in the GOP, but it is also possible to set a plurality of P pictures as access points in the GOP. FIG. 2 shows an exemplary GOP structure with two P picture access points AP1 and AP2 in one GOP. P4, which is the first P picture access point AP1, is the same as in the example above with a single P picture access point AP, so an explanation will be omitted. The second access point AP2 is P8. P4 is encoded by prediction from I1, but P8, the second access point AP2, is temporally more remote from I1. In general, the more temporally remote the picture to be predicted is, the less accurate the prediction becomes, resulting in degradation of picture quality. Therefore, it is better for P pictures at and after the second access point AP2 to be predicted from the P picture at the immediately preceding access point (e.g., AP1) than from the I picture. P8, positioned at the second access point AP2, is encoded by prediction from P4 at the first access point AP1. It is not always necessary to predict from the immediately preceding access point, however, because prediction from I1 may sometimes allow more efficient encoding.

Therefore, the encoding constraints for the second and subsequent P picture access points are as follows:
1. A picture used as an access point must be an I or P picture;
2. A P picture used as an access point must be predicted from the initial I picture of the GOP, or another P picture used as an access point; and
3. Pictures following a P picture used as an access point must not be predicted or referenced from pictures preceding the access point, other than the initial I picture of the GOP or a P picture used as an access point.

When the user wants to start reproduction from P8, which is used as the second access point AP2, I1 at the start of the GOP is reproduced first. Next, P4, which is the first access point AP1, is read and decoded; then P8 is read and decoded. Subsequent reproduction can be performed in the usual manner. Differing from the case of a single access point AP, when there are a plurality of access points, it is necessary to reproduce the initial I picture of the GOP and the P pictures at access points preceding the intended access point, so the farther back in the GOP the access point is, the more time is needed before reproduction begins. Nevertheless, the pictures can be reproduced considerably more quickly than if they had been encoded without these constraints.

Under the above encoding conditions, the following index information is added to the picture data to facilitate reproduction from an access point in the interior of a GOP. FIG. 3 is shows the structure of the index information for accessing a P picture used as an access point. In FIG. 3, Entry_map( ) is a data area in which information necessary for access points is stored; Entry_map ( ) constitutes part of the navigation data. Navigation data refers in general to control information and management information for controlling reproduction of contents such as video files on a recoding medium, and includes the access point index information.

number_of_IAP in FIG. 3 gives the total number of I pictures in a motion video file. A motion video file consists of a plurality of GOPs. The initial I picture of a GOP is not necessarily used as an access point, and accordingly the value indicated in number_of_IAP need not be the same as the number of the GOPs, but it never exceeds the total number of the GOPs.

The for loop statement following number_of_IAP in FIG. 3 is a loop repeated this (number_of_IAP) number of times. The following access point information is coded therein, for the interval from one I picture access point to the next I picture access point. This may be regarded as per GOP access point information, because in a GOP on the order of several seconds long, the I picture at the beginning of the GOP is always designated as an access point.

The I_PTS_AP[IAP_id] in FIG. 3 gives the presentation time of an I picture, which is display time information indicating the reproduction timing at the start of the access point. The presentation time may be either the PTS given for each picture in MPEG2, or the relative time from the initial picture in the video file. The bracketed [IAP_id] is the number of a particular I picture access point among the number_of_IAP I picture access points. I_PTS_AP[IAP_id], for example, gives I_PTS_AP information for the I picture access point designated by [IAP_id]. The meaning of this notation is the same below, so subsequent explanations will be omitted.

The next item, I_SCN_AP, is information giving the position in the video file or on the disc of the initial I picture access point. In this embodiment, the sector offset of the I picture relative to the start of the video file is given. It will be appreciated that a byte offset or the like can be used instead of a sector offset: any information may be used that can identify the position of the I picture relative to the start of the video file, or the absolute position of the I picture on the disc. Size_of_IAP is information giving the data size of the initial I picture access point. In this example, the sector offset of the sector containing the last byte of the I picture relative to the start of the GOP including the I picture is given. From these three items of access point information, the starting point, presentation time, and data size of the initial I picture access point can be identified.

In number_of_PAP in FIG. 3, the total number of P picture access points from one I picture access point to next I picture access point, that is, the total number of P picture access points until the start of the next GOP, is given. The following for loop statement is a loop repeated this (number_of_PAP)

number of times. P_PTS_AP[IAP_id][PAP_id] is similar to I_PTS_AP above, giving the presentation time, indicating the display timing, of a P picture used as an access point. In this embodiment, the presentation time may be the PTS given for each picture in MPEG2, or the relative time from the start of the video file. In general, the less data other than video data there is, the better. For a clock frequency of 90 kHz, an absolute PTS requires 33 bits of data, but if the maximum GOP length is five seconds, the amount of data required for a relative PTS is reduced to 19 bits, so the value of P_PTS_AP [IAP_id][PAP_id] is preferably the relative time from the start of the GOP. In this embodiment, the presentation time is relative to the start of the video file. The bracketed [IAP_id] [PAP_id] gives information that corresponds to the number of a particular P picture access point among the (number_ of_PAP) P picture access points from the I picture identified by IAP_id to the next I picture access point. For example, P_PTS_AP[IAP_id][PAP_id] designates the P_PTS_AP information of the P picture access point identified by [PAP_id] among the P picture access points from the single I picture access point identified by [IAP_id] to the next I picture access point. The meaning of this notation is the same below, so subsequent explanations will be omitted.

The next item, P_SCN_AP, is similar to the above I_SCN_AP, giving information about the position at which a P picture access point starts in a GOP, or in the video file. The sector offset relative to the start of the I picture access point is given here. The Size_of_PAP information is similar to Size_of_IAP, giving the data size of the P picture access point. The sector offset of the sector including the last byte of the P picture used as an access point, relative to the start of the P picture, is given. From the above three items of information, the video image starting position, presentation time, and data size of a P picture used as an access point can be identified.

Figure 4:
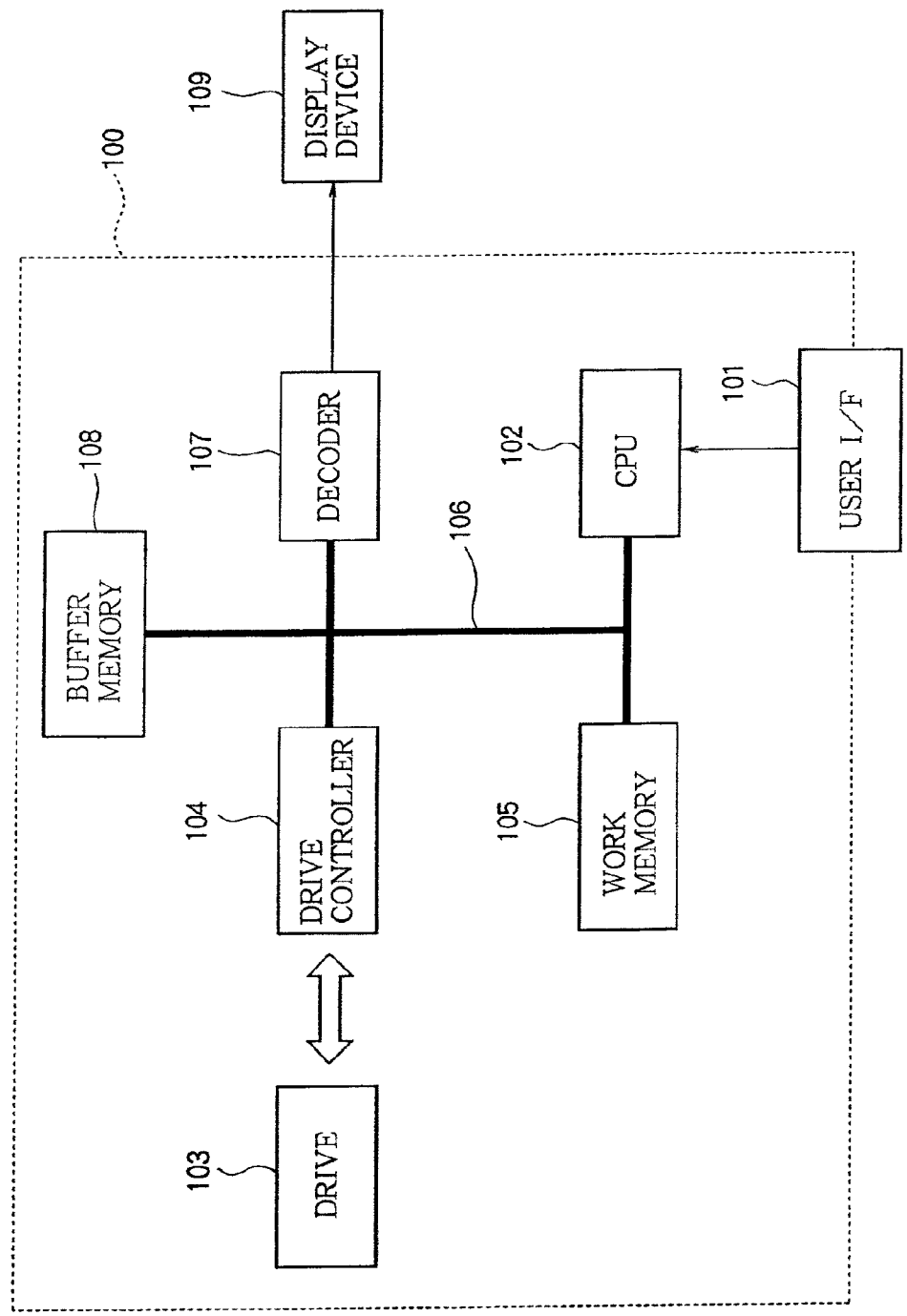
FIG. 4 is a block diagram illustrating the structure of a reproducing device according to the first, a fourth, and a fifth embodiment.
Figure 5:
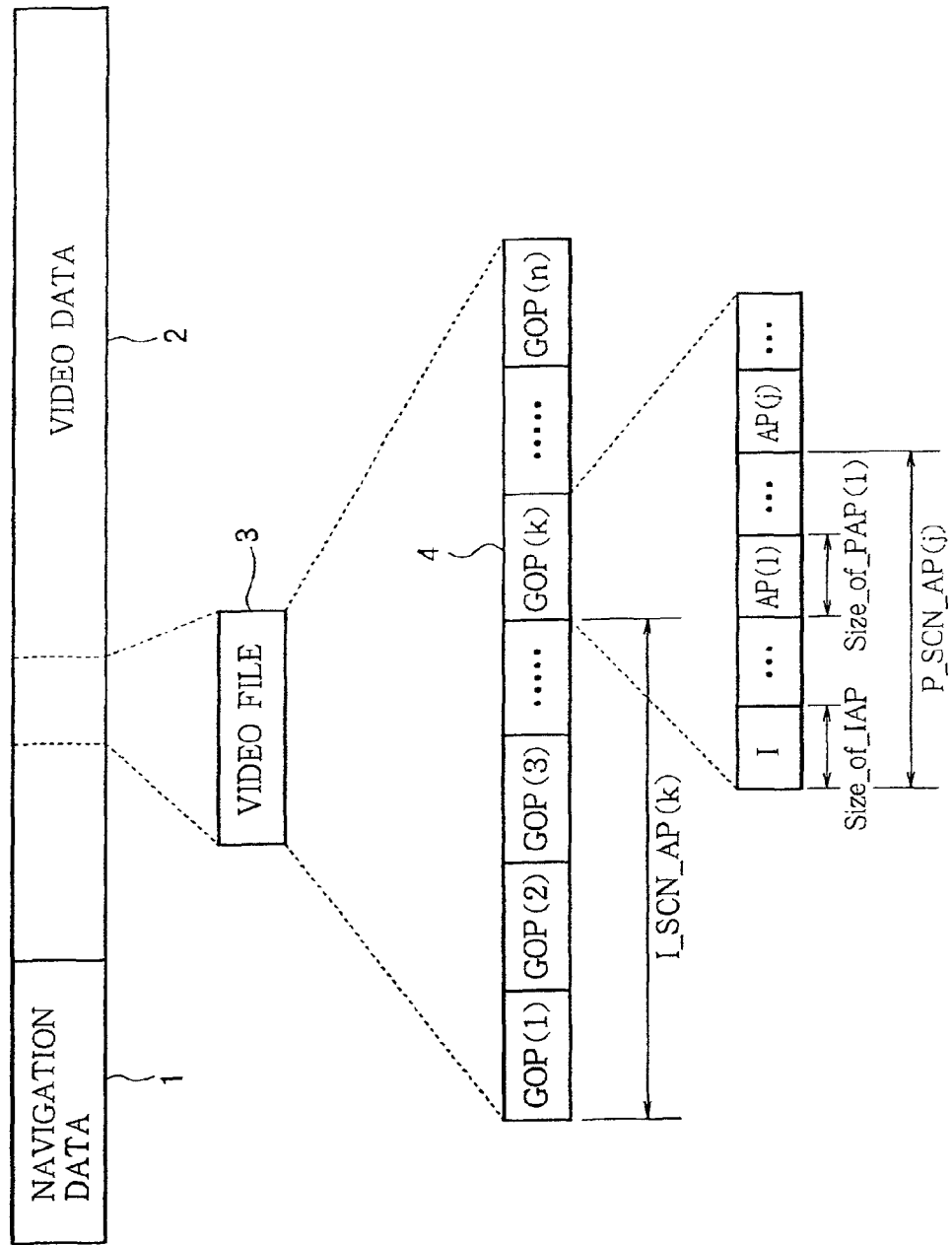
FIG. 5 illustrates the relationship between a video file on an optical disc and the management data in Entry_map( ) in the first embodiment.

Structuring the access point index information as described above enables positional information, temporal information, and the picture size of each access point to be identified. Next, a procedure for using the above index information to start reproduction from an access point will be described. FIG. 4 shows the structure of a reproducing device 100, and FIG. 5 shows the relationship between a picture file on an optical disc and the management data in Entry_map( ).

First, an example of the ordinary reproduction sequence will be described. When a reproduce instruction from the user is input through the user interface (I/F) 101 to the CPU 102, a command to read navigation data 1 is output to the drive controller 104, which controls the drive 103 that reads data from an optical disc. The read-out navigation data 1 are transferred via the drive controller 104 to a work memory 105. The drive controller 104 and the work memory 105 are connected to the CPU 102 via a system bus 106 comprising an address bus and a data bus, which is used to transfer commands from the CPU 102 and transfer data between blocks. The CPU 102 extracts management information regarding the program designated for reproduction by the user from the navigation data 1 deployed in the work memory 105. Based on the extracted management information, the CPU 102 instructs the drive controller 104 to read the data of the video file 3 required for reproduction from the video data 2, and the drive 103 reads out the desired data. The read-out data are temporarily stored, via the system bus 106, in a buffer memory 108 of the decoder 107, which decodes the coded data. The CPU 102 controls this process to prevent the buffer memory 108 from being exhausted or overflowing, in order to achieve reproduction without interruption in picture or sound. The data stored temporarily in the buffer memory 108 are decoded by the decoder 107 into a video signal, which is output to a display device 109 such as a TV monitor.

Next, the flow of processing in a time search, in which the user designates a time, will be described. When the user interface 101 outputs a search instruction having a time specified by the user, the CPU 102 refers to the Entry_map( ) of the navigation data 1 stored in the work memory 105. Among the I_PTS_AP in Entry_map( ), let I_PTS_AP(k) be the time information of the I picture access point closest to the time specified by the user. Among the P_PTS_AP, let P_PTS_AP (j) be the time information of the closest P picture access point (where j is an integer equal to or greater than one, indicating the j-th P picture access point counted from the I picture). The above I picture will be assumed to belong to GOP(k) 4.

The starting address of the video file 3 currently being reproduced can be recognized from the file system in the storage medium. Therefore, the absolute address of the initial I picture in the GOP(k) 4 containing the intended access point will be the starting address of the video file 3 plus the I picture position information I_SCN_AP(k). The CPU 102 instructs the drive controller 104 to read data from this absolute address. The amount of data read is equivalent to the number of sectors given in Size_of_IAP, which is the data size of the I picture. The I picture data read according to the position information and data size are temporarily loaded from the drive controller 104 into the buffer memory 108.

When the reading of the I picture is completed, the CPU 102 instructs the drive controller 104 to read data from an address determined by adding the following three addresses: the starting address of the video file, the I picture position information I_SCN_AP(k), and the position information of the next P picture access point (P_SCN_AP(1), not shown). The amount of data read is equivalent to the number of the sectors given in Size_of_PAP(1). The data of the P picture thus read according to the position information and data size is temporarily loaded from the drive controller 104 into the buffer memory 108.

In order to reproduce P picture j, it suffices to read the I picture in GOP(k) 4 and the P pictures at the following access points AP(1) to AP(j), so the above process is repeated j times. The intended access point P_PTS_AP(j) is thereby reached.

The CPU 102 calculates timings to output video from the intended access point within the shortest period, transfers data stored in the buffer memory 108 to the decoder 107, and starts decoding. Reproduction from the user-specified time is carried out in the above manner. The above description is for a time search process in which the user specifies the time at which to start reproduction, but it will be appreciated that the user can specify the picture or address at which reproduction is to start; the specified reproduction position in the present invention includes positions specified by time, address, or picture etc.

As described above, using I pictures and P pictures as access points designated as randomly accessible positions enables access points to be designated at reasonable intervals, without reducing the number of access points, even in low-bit-rate coding systems such as MPEG4-AVC.

When a picture used as an access point is a P picture, coding efficiency can be maintained by coding the picture by prediction either from a temporally preceding P picture or from the initial I picture in the GOP.

Furthermore, reproduction following the access point can proceed smoothly because pictures temporally following an I picture or a P picture used as an access point are not coded by prediction from pictures temporally preceding the I picture or the P picture used as the access point, other than the initial I picture in the GOP and other pictures used as access points.

Storing information on the optical disc or other video information recording medium giving the presentation time, position, and data size of pictures used as access points enables quick reproduction from access points in the interiors of GOPs.

According to the present embodiment, compression efficiency can be improved by increasing the GOP length without compromising random accessibility.

Second Embodiment

Figure 7:
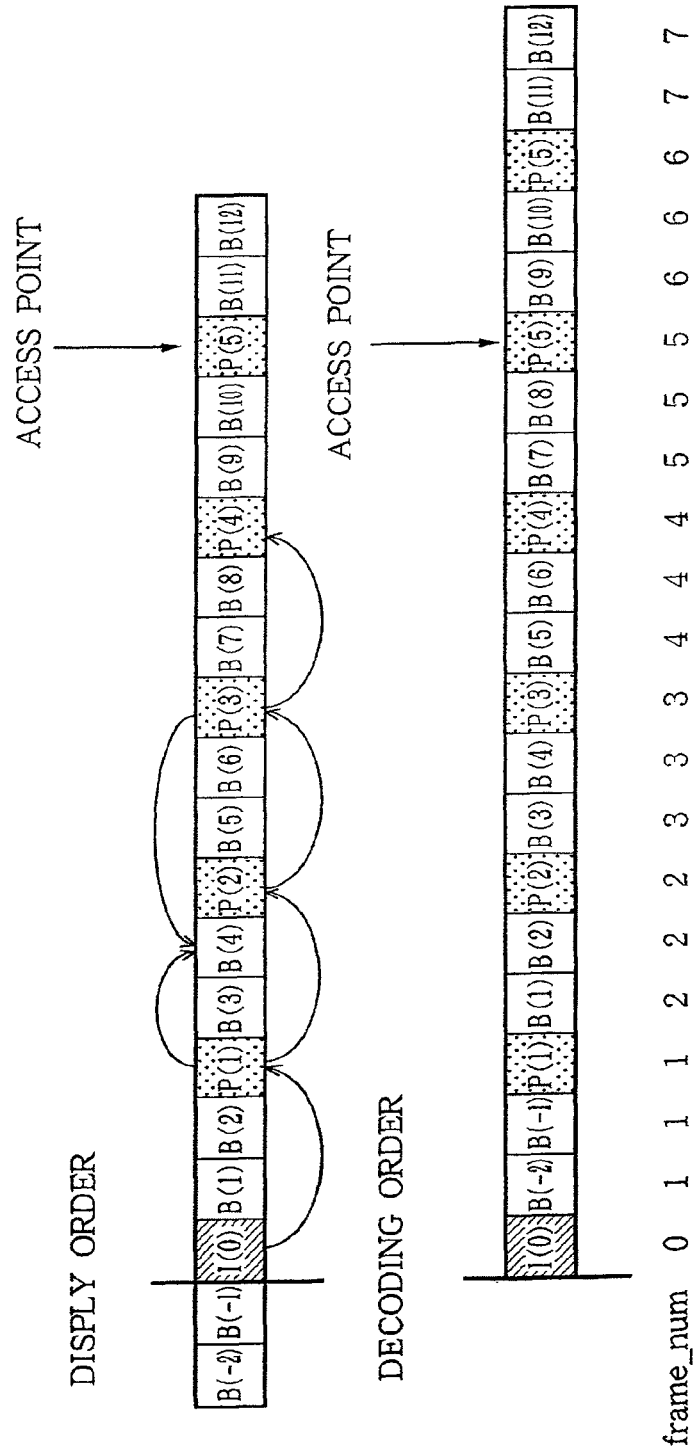
FIG. 7 illustrates the relationship between picture references and frame_num in a GOP in the second embodiment.

In the first embodiment, P_PTS_AP[IAP_id][PAP_id], which indicates relative time from the start of the GOP, was used as information giving the presentation time of the access points in the GOP, but a method of obtaining time information by using information with a smaller data size will now be described. FIG. 6 shows a new structure of Entry_map( ) which differs from the Entry_map( ) shown in FIG. 3 in that frame_num[IAP_id][PAP_id] is used instead of P_PTS_AP [IAP_id][PAP_id]. frame_num is a parameter given in the slice header in an MPEG4-AVC stream. frame_num is incremented every time a reference picture is decoded, and takes on 4-bit to 16-bit values. FIG. 7 shows the relationship between frame_num and the picture references in a GOP. As shown in FIG. 7, the value of frame_num is incremented by one every time a reference picture is decoded. The display order of an access point is calculated by the following equation.

Display_order[IAP_id][PAP_id]=(frame_num [IAP_id][PAP_id]-frame_num[IAP_id])*M

M in this equation is a value indicating the interval between P pictures: in FIG. 7, M=3. When calculated according to the above equation, the indicated access point works out to be fifteenth in the display order. On the assumption that the PTS clock frequency is 90 kHz and the frame frequency is 24 Hz, the PTS difference between frames is 90000/24=3750, so the PTS value relative to the initial picture of the GOP is calculated by the following equation.

P_PTS_AP[IAP_id][PAP_id]=Display_order [IAP_id][PAP_id]*3750

To make calculations such as in the two equations above possible, the following encoding constraints must be satisfied.
1. No B picture is used as a reference picture.
2. No reference is made that causes a reordering of reference pictures.
3. The number of B pictures between two reference pictures in the GOP is fixed.
When the above conditions are satisfied, the presentation time of an access point can be calculated easily from the value of frame_num. The data size of frame_num is 16 bits at maximum, but it is not necessary for all the frame_num bits to be used. For example, if the maximum GOP length is five seconds, the frame frequency is 30 Hz, and M=3, then the maximum number of frames in a GOP is 150, of which 50 are P pictures. Therefore, the relative frame offset from the I picture can be calculated using the least significant six bits in frame_num.

As described above, if predetermined constraints are satisfied during encoding, the presentation time of a P picture used as an access point can be calculated easily from frame_num and the amount of data other than video data can be reduced, compared with use of PTS. Although the presentation time of an access point is calculated from frame_num in this embodiment, the presentation time of an access point can be similarly calculated from any information that indicates the decoding order.

Third Embodiment

In the first embodiment, a method of accessing an access point at a P picture in the interior of a GOP was described. In the present embodiment, a reproducing method with high image quality as well as high access speed, obtained by control of the encoding system, will be described.

In the first embodiment, the picture used for prediction of a P picture at an access point was a P picture at another access point or the initial I picture in the GOP. In general, in order to reduce the amount of code in a P picture, it should be predicted from a picture as temporally close as possible. Therefore, for the same coding bit rate, a picture can be encoded with higher image quality if it is predicted from a picture closer than the initial I picture. Access points are set at intervals such as 0.5 seconds or 1.0 second, but when a P picture is predicted from a picture this temporally remote, the amount of coded data is quite likely to increase. It can therefore be anticipated that image quality will be inferior to that obtained when no access points are set in the interiors of GOPs.

In the description of the first embodiment, bits were read from the disc at a rate comparatively close to the coding bit rate. When reading is performed at a considerably higher rate than the coding rate, the data in the interval preceding the intended access point can be read within a relatively short time without a seek operation. Therefore, if the following encoding constraints are imposed, access points can be predicted from P pictures relatively close by, and image quality will be improved:
1. A picture used as an access point must be an I picture or a P picture;
2. A P picture used as an access point must be predicted from the initial I picture of the GOP, or a P picture temporally preceding the access point, and the pictures necessary for decoding a P picture used as an access point must not include any B pictures;
3. Pictures following a P picture used as an access point must not be predicted or referenced from pictures preceding the access point, other than the initial I picture of the GOP or a P picture used as an access point.

Figure 8:
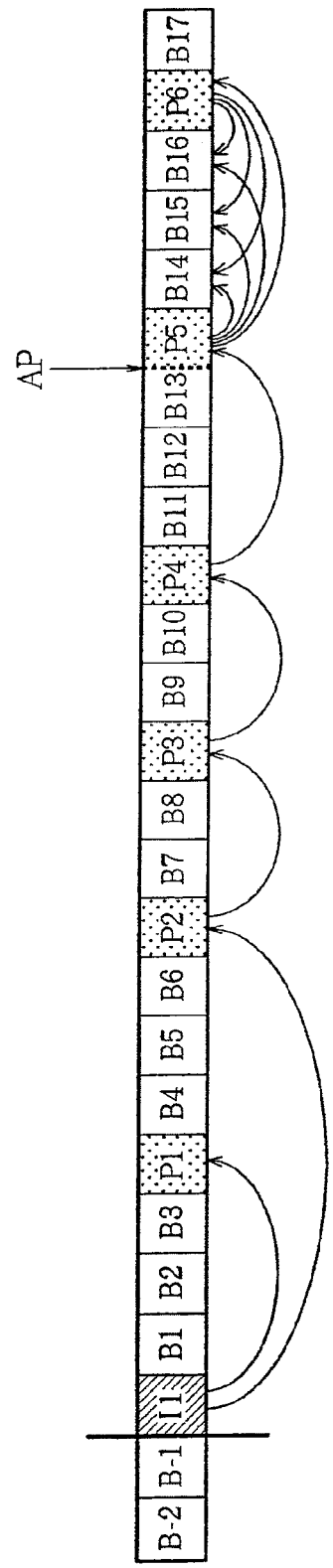
FIG. 8 illustrates the structure of a GOP according to a third embodiment.

The difference from the first embodiment is that when a P picture used as an access point is encoded it may be predicted from any P picture disposed between the I picture and the access point, provided the previous pictures necessary for decoding the P picture at the access point do not include any B pictures. FIG. 8 shows the structure of a GOP encoded under the above constraints. In FIG. 8, P5, which is an access point, is predicted from P4, P4 from P3, P3 from P2, and P2 from I1. Owing to the above encoding constraints, to decode access point P5, only four other pictures (I1, P2, P3, and P4) have to be decoded. P1 in FIG. 8 is not a picture necessary for decoding access point P5, so P1 could be predicted from a B picture.

As described in the first embodiment, when no encoding constraints are imposed, eighteen pictures preceding P5 may have to be decoded in order to decode P5. The third embodiment can significantly decrease the number of pictures to be decoded.

It will assumed here that the reading rate from the disc is 10 Mbps, the coding rate is 2 Mbps, the coding ratio of I pictures to B pictures to P pictures is 10:6:1, and the time necessary for decoding a P picture is 20 msec. The amount of data from I1 to P5 is about 1.5 Mbits, which takes about 150 msec to read.

Decoding up to P5 takes about 100 msec. In this case, as more time is necessary for reading than decoding, P5 can be decoded in 150 msec. In this manner, when the coding rate is considerably lower than the reading rate, access points can be reproduced quickly if the above constraints are imposed when the data are encoded. This would be impractical if the coding rate were 10 Mbps, as in the first embodiment, because then reading the data would take about 750 msec, which is five times 150 msec.

Figure 9:
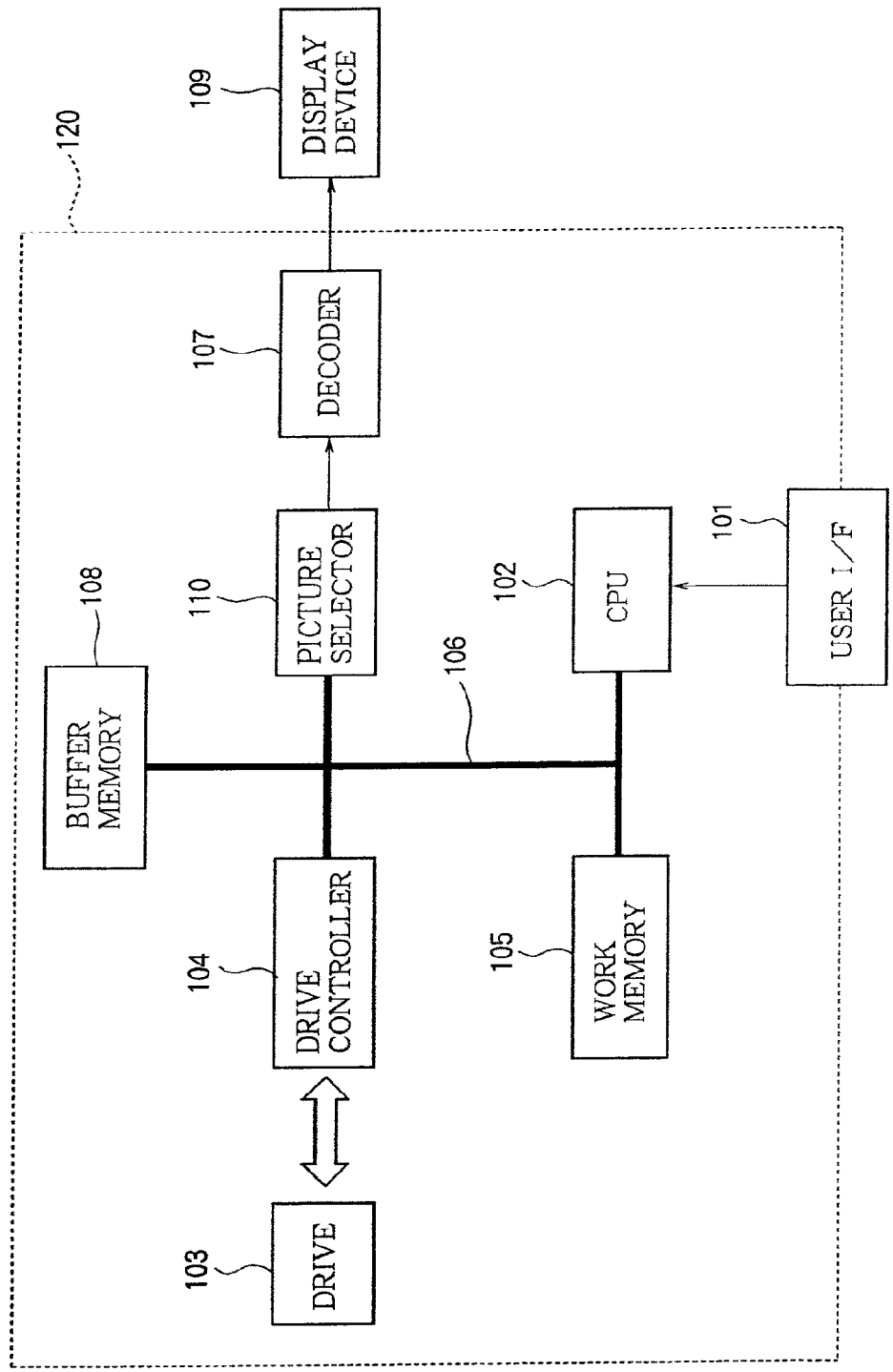
FIG. 9 is a block diagram showing the structure of a reproducing device according to the third embodiment.

Next, a method of selecting the P pictures necessary for decoding access point P5 from the continuously read sequence of picture data will be described with reference to FIGS. 9, 10 and 11. FIG. 9 shows the structure of the reproducing device 120, and FIG. 10 shows the structure of GOP_access_info, which gives information about access within each GOP. The reproducing device 120 in FIG. 9 differs from the reproducing device 100 in FIG. 4 in that when data stored in the buffer memory 108 are output to the decoder 107, the output pictures are selected by a picture selector 110 that selects pictures necessary for decoding access points based on information indicating whether the pictures are necessary or not.

As the pictures are automatically selected in the LSI chip, GOP_access_info precedes each I picture access point in the video file 3 in FIG. 5. In the case of MPEG4-AVC, GOP_access_info is commonly recorded in a user region in the SEI (Supplemental Enhancement Information). SEI is a management information region dispersed in the video file, preceding the I picture at each access point.

In FIG. 10, ref_IAP_id gives a number for identifying an I picture access point in, for example, the Entry_map( ) shown in FIG. 3. However, ref_IAP_id is not particularly necessary information. The next item, number_of_P_picture_in_GOP, gives the total number of P pictures present from the I picture at the access point identified by ref_IAP_id up to the last access point in the GOP. The following for loop statement is a loop repeated this (number_of_P_picture_in_GOP) number of times. frame_num gives information from which the presentation time of a P picture is calculated as described in the second embodiment. Although frame_num is used for the calculation here, PTS can be used instead, as in the first embodiment. P_SCN_AP gives information indicating the sector offset of the intended picture relative to the start of the GOP. Use of P_SCN_AP enables the location of the P picture data for the intended access point to be calculated directly and accessed rapidly.

picture_type gives attribute information that indicates if each P picture is an access point, or is necessary for decoding the next P picture access point. picture_type has the value '2' when the P picture is an access point itself, the value '1' when the P picture is a P picture necessary for decoding the next access point, and the value '0' otherwise. From the above information, the presentation time and position of a P picture used as an access point in a GOP and the presentation time and position of the P pictures necessary for decoding the access point can be obtained.

In FIG. 11, ref_IAP_id gives a number for identifying an I picture, which is an access point, in, for example, the Entry_map( ) shown in FIG. 3. The number_of_PAP item gives the total number of P picture access points from the I picture access point identified by ref_IAP_id to the next I picture access point. The following for loop statement is a loop repeated this (number_of_PAP) number of times. P_PTS_AP[PAP_id] and P_SCN_AP[PAP_id] give information specifying the presentation time and position of the P picture identified by the identification number [PAP_id], which identifies a P picture used as an access point, as described in the first embodiment. P_PTS_AP is necessary to identify the P picture access point closest to the time specified by the user in a time search, but the P_SCN_AP information is not particularly necessary. P_SCN_AP can, however, be used instead of or together with P_PTS_AP. number_of_P_picture gives the total number_of_P_pictures present between two access points. The following for loop statement is a loop repeated this (number_of_P_picture) number of times. picture_type gives attribute information indicating if each P picture is necessary for decoding the next P picture access point, taking, for example, the value '1' when the P picture is necessary and the value '0' when it is not. The appended [PAP_id][P_id] means that the picture may be identified by either its P picture access point identifier [PAP_id] or its P picture identifier [P_id].

In FIG. 9, the data read out from the address given in I_SCN_AP in Entry_map( ) are temporarily stored in the buffer memory 108, then sent to the picture selector 110. The picture selector 110 selects the pictures necessary for decoding access point P5 according to the picture_type information and transfers them to the decoder 107. As the picture boundaries can generally be identified by header information present at the start of each picture, positional information does not have to be added for each picture, but if there is no such header information, positional information for each picture may be added in GOP_access_info.

The same effect can be obtained in this embodiment if the picture selector 110 precedes the buffer memory 108 instead of the decoder 107, and selects the picture data necessary for decoding before storing the data in the buffer memory 108.

Next, the operation in a time search in which the user specifies a presentation time will be described. FIG. 12 shows the Entry_map( ) in the third embodiment. The differences from the first embodiment are that no information follows number_of_PAP, and that SEI_SCN_AP[IAP_id] replaces I_SCN_AP[IAP_id]. SEI_SCN_AP[IAP_id] gives positional information about the SEI that immediately precedes the I picture at the access point identified by the number [IAP_id], specifying the position of the SEI in the video file or on the disc. In this embodiment, the sector offset of the SEI immediately preceding the I picture access point is given relative to the start of the video file. A byte offset may be used instead of a sector offset: any information may be used that can identify the position of the SEI relative to the start of the video file, or the absolute position of the SEI on the disc.

In the third embodiment, there is no need for a direct seek to a P picture access point in the GOP, because the data are read from the I picture access point to the P picture access point without a seek operation. Therefore, only information about I picture access points is necessary in Entry_map( ). In order to read an I picture at an access point, its SEI, which gives management information from the I picture access point to the next I picture access point, must be read first, so the SEI_SCN_AP information that gives the position of the SEI is recorded in Entry_map( ).

When the user specifies a time or an image to be reproduced, Entry_map( ), which is a management region separate from the content data region, is accessed, and the I picture access point closest to the specified time is identified as in the first embodiment. Next, the GOP_access_info identified by the ref_IAP_id number corresponding to this I picture access point is accessed, based on the access point information of the identified I picture, particularly on the SEI_SCN_AP information giving the position of the SEI.

A difference from the first embodiment is that data are now read continuously, starting from the address specified by I_PTS_AP(k) for the identified I picture access point. From among the data read preceding the P picture access point closest to the intended time, the P pictures necessary for decoding the access point are decoded; then the access point data and all of the data read thereafter are decoded to perform reproduction starting from the P picture access point closest to the intended time.

FIGS. 10 and 11 illustrate the case in which GOP_access_info( ) is present in the video file, but a similar function can be realized if this information is given in Entry_map( ) in the navigation information. Note that as the navigation information is commonly interpreted by the CPU 102, if GOP_access_info( ) is given in Entry_map( ), picture selection information needs to be sent from the CPU 102 to the picture selector 110 every time the start of a GOP, for example, is accessed.

As described above, when the bit rate is considerably higher in reading than in encoding, access points can be specified at appropriate intervals without reducing the number of the access points, even in a low-bit-rate encoding scheme such as MPEG4-AVC, by using I pictures and P pictures as access point pictures designated as randomly accessible positions.

When a picture used as an access point is a P picture, coding efficiency and high image quality can both be achieved by coding the picture by prediction either from a temporally preceding P picture or from the initial I picture in the GOP.

Furthermore, reproduction following the access point can proceed smoothly because pictures temporally following an I picture or a P picture used as an access point are not coded by prediction from pictures temporally preceding the I picture or the P picture used as the access point, other than the initial I picture in the GOP and other pictures used as access points.

Storing information on the optical disc or other video information recording medium giving the presentation time of pictures used as access points enables quick reproduction from access points in the interiors of GOPs. Furthermore, whether a picture is necessary for decoding the next access point or not can be determined easily because attribute information indicating if the picture is necessary or not is recorded.

According to the present embodiment, compression efficiency can be improved by increasing the GOP length without compromising image quality or random accessibility.

Fourth Embodiment

In the case described in the third embodiment, the coding rate was lower than the reading rate, but when the coding rate does not differ significantly from the reading rate, the data reading time becomes impractically long. Suppose that the coding bit rate is 8 Mbps, and the coding ratio of I pictures to B pictures to P pictures is 4:2:1. The amount of data preceding access point P5 in FIG. 8 will then be about 5 Mbits, which takes 500 msec to read; this is considerably longer than the time necessary for reading when low-bit-rate encoding is performed. To resolve this problem, it is necessary to read only the data needed for decoding the P picture access point and omit other data. For example, removing the data not needed for decoding P5 from the data preceding the access point at P5 in FIG. 8 can reduce the reading time by half by reducing the amount of data to about 2.5 Mbits. Reading of only the data needed for decoding an access point can be realized by encoding under the following constraints:

1. A picture used as an access point must be an I or P picture;
2. A P picture used as an access point must always be predicted from the initial I picture of the GOP or a P picture preceding the access point, and the pictures necessary for decoding a P picture used as an access point must not include any B pictures;
3. Pictures following a P picture used as an access point must not be predicted or referenced from pictures preceding the access point, other than the initial I picture of the GOP or a P picture used as an access point; and
4. The P pictures used for predictively encoding a P picture used as an access point, that is, the P pictures necessary for decoding, must be arranged in continuous succession immediately following an I picture or a P picture used as an access point.

The fourth embodiment differs from the first embodiment in that the fourth constraint is added, and that in the second constraint, an access point can be predicted from a P picture not used as an access point. In the first embodiment, predictions were made from an I or P picture access point in order to avoid time-consuming seek operations. In the fourth embodiment, however, because the P pictures necessary for decoding an access point are arranged in a continuous series, predictions can be made from closer P pictures, and the amount of code at a P picture access point can be reduced.

Figure 13:
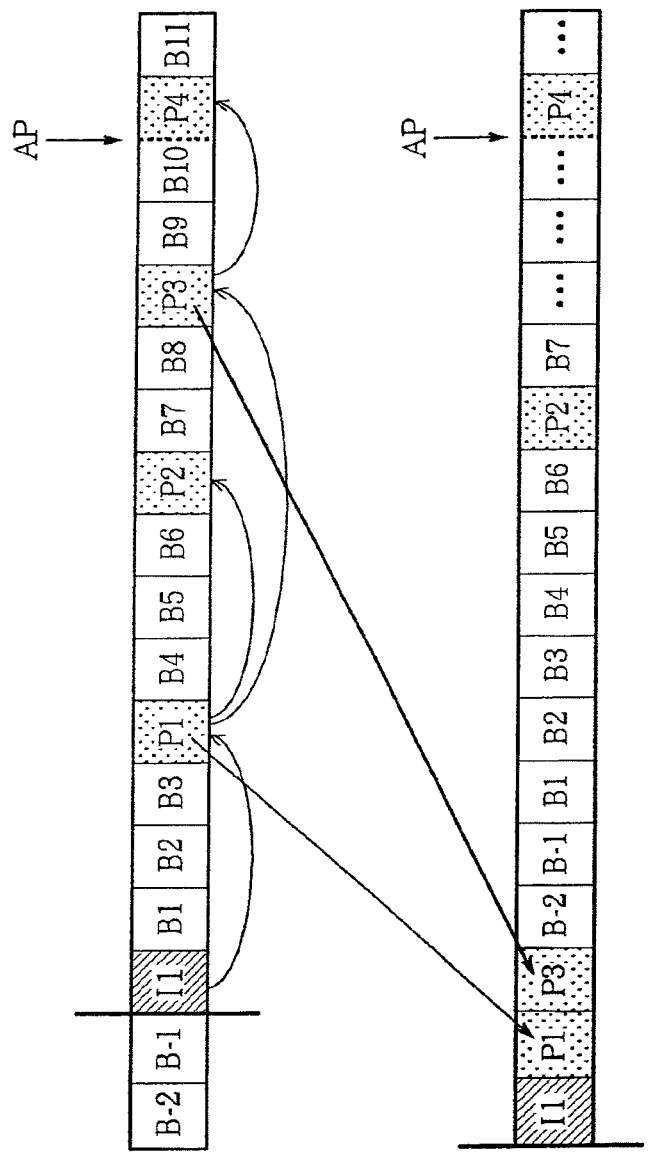
FIG. 13 illustrates the relationship between the picture sequence arranged in presentation order and the sequence rearranged at the time of recording for random access in a fourth embodiment.

In MPEG4-AVC, although pictures must be input to the decoder in the order in which they should be decoded, the pictures may be arranged arbitrarily when recorded. This embodiment resolves this inconsistency by proposing a new GOP structure. FIG. 13 shows the relationship between a sequence of pictures arranged in their presentation order (reproduction order, upper sequence), and the sequence is reordered at the time of recording for random access reproduction (lower sequence).

In FIG. 13, P4 at the position of access point AP is encoded by prediction from P3, P3 is encoded by prediction from P1, and P1 is encoded by prediction from I1. Therefore, since I1, P1, and P3 have to be decoded in this order to decode P4, P1, and P3 follow I1. P2, which is not necessary for decoding P4, need not be included in this sequence. Pictures following P3 are arranged in the order in which they are decoded. That is, the P pictures necessary for decoding P4 at access point AP have been extracted from the sequence of pictures arranged in the decoding order, the extracted P pictures have been placed immediately after the I picture, and the gaps in the picture sequence left by the extraction of the extracted P pictures have been closed up.

When, as above, the pictures are not arranged in their decoding order, they must be reordered in the decoding order before being sent to the decoder. FIG. 14 shows the configuration of a GOP_structure( ) which gives information necessary for reordering. GOP_structure( ) forms a part of the navigation data 1 (FIG. 5). This embodiment will be described on the assumption that there is one GOP_structure( ) per motion video file. number_of_GOP gives the total number of GOPs in the motion video file. The following for loop statement is a loop repeated this (number_of_GOP) number of times. GOP_PTS[GOP_id] is a presentation time that gives the reproduction timing of the initial picture of the GOP. [GOP_id] is a number specifying the specific GOP to which the data pertains; the meaning of this notation is the same below, so subsequent explanations will be omitted. number_of_picture gives the total number of pictures in the GOP. The next for loop statement is a loop repeated this (number_of_picture) number of times. decode_order [GOP_id][picture_id] gives the order in which the pictures in the GOP are decoded. [GOP_id][picture_id] indicates that the data pertain to [picture_id], which specifies a particular picture in the GOP_identified by [GOP_id]; the meaning of this notation is the same below, so subsequent explanations will be omitted. The CPU 102 rearranges the read data in the buffer memory 108, based on the picture decoding order information, and transfers the reordered pictures to the decoder 107 in the decoding order. This embodiment is described on the assumption that GOP_structure( ) is located in the navigation data 1 in FIG. 5, but GOP_structure( ) does not necessarily have to be treated as navigation data 1. For example, GOP_structure( ) may be stored in a region for recording control information specially reserved at the start of each GOP (preceding the video data) or, in the case of MPEG4-AVC, in user regions in the SEI (Supplemental Enhancement Information); either scheme has the same effect. In these schemes number_of_GOP is not necessary; it is only necessary to give the information given in the number_of_GOP loop.

Figure 15:
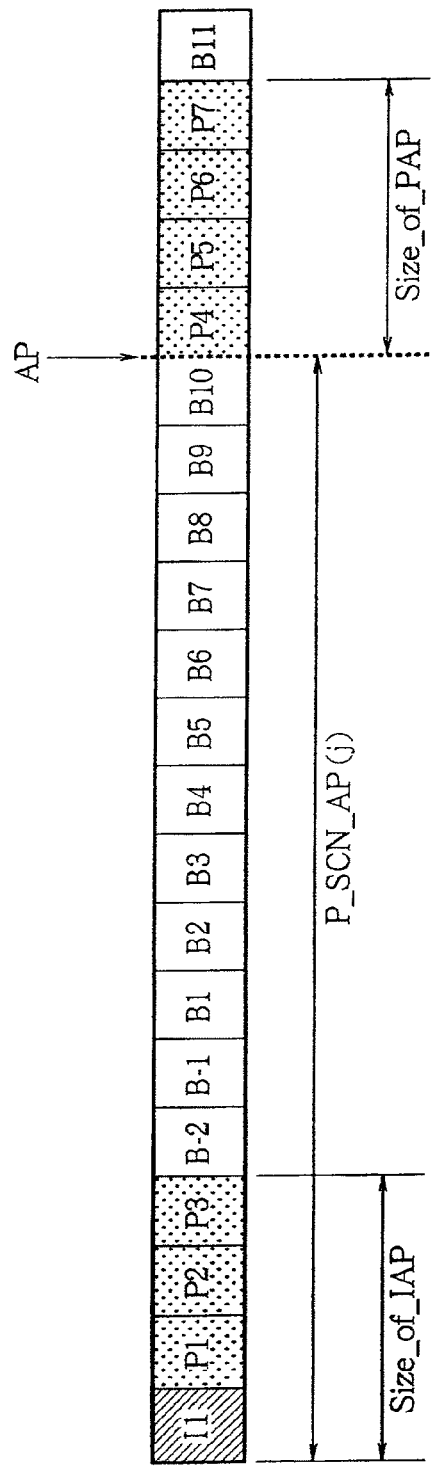
FIG. 15 illustrates the relationship between Entry_map( ) and the picture sequence in the fourth embodiment.

Next, the operation in a time search in which the user specifies a presentation time will be described. FIG. 15 shows the relationship between Entry_map( ) and the sequence of pictures. When the user specifies a desired time or a desired image to be reproduced, data reading starts from the address identified by I_PTS_AP(k) which is closest to the specified time, as in the first embodiment. The amount of data read is the number of sectors given in Size_of_IAP, but whereas in the first embodiment this was the total number of the sectors in the I picture, in the fourth embodiment Size_of_IAP gives the data size of the pictures necessary for decoding the next access point AP after the I picture access point, that is, the data size of the pictures necessary for decoding P4. In FIG. 15, this is the total number of sectors in I1 plus the total number of following sectors in P1, P2, and P3. Similarly, Size_of_PAP gives the data size of the pictures necessary for decoding the next access point (not shown) after P4, the picture located at access point AP: in this case, the total number of sectors in P4, P5, P6, and P7. The operation of this embodiment is similar to the operation of the first embodiment, so further description will be omitted.

As described above, using I pictures and P pictures as access points designated as randomly accessible positions enables access points to be designated at reasonable intervals, without reducing the number of access points, even in low-bit-rate coding systems such as MPEG4-AVC.

When a picture used as an access point is a P picture, coding efficiency and high image quality can both be achieved by coding the picture by prediction either from a temporally preceding P picture or from the initial I picture in the GOP.

Furthermore, reproduction following the access point can proceed smoothly because pictures temporally following an I picture or a P picture used as an access point are not coded by prediction from pictures temporally preceding the I picture or the P picture used as the access point, other than the initial I picture in the GOP and other pictures used as access points.

When a P picture in the interior of a GOP is used as an access point, re-arranging the sequence of pictures so that the I picture and any other P pictures used for predictively encoding the P picture, that is, the I and P pictures necessary for decoding the P picture, are bunched together can shorten the access time to the access point.

Storing information on the optical disc or other video information recording medium giving the presentation time, position, and data size of pictures used as access points enables quick reproduction from access points in the interiors of GOPs.

Furthermore, re-arrangement of pictures at the time of decoding is facilitated by the recording of the decoding order of the pictures for each GOP (video unit).

According to the present embodiment, compression efficiency can be improved by increasing the GOP length without compromising image quality or random accessibility.

Fifth Embodiment

Increasing the GOP length has an effect not only on random access reproduction as described above; it also has considerable effect on trick reproduction modes such as fast-forward reproduction. When the GOP length is increased in the MPEG4-AVC scheme, the interval between I pictures extends to a few seconds, which adversely affects video quality in a fast-forward reproduction mode in which, for example, only I pictures are reproduced. In this embodiment, a method of fast-forward reproduction with high quality, obtained by adding improvements to the fourth embodiment, will be described. In the following explanation, descriptions of elements similar to elements in the fourth embodiment will be omitted.

In general, in order for fast-forward reproduction to proceed smoothly, not only I pictures but also P pictures in the interiors of GOPs must be reproduced. In DVD, for example, smooth fast-forward reproduction is realized by use of positional information about the first three P pictures in each GOP, which is given in the navigation data. In DVD, one GOP generally lasts 0.5 second and has about four P pictures. Therefore, if the given positional information is used to reproduce the first three P pictures in a GOP, that covers almost all of the P pictures in the GOP, making smooth fast-forward reproduction possible. When the length of the GOP is increased to a few seconds or more, however, the number of P pictures in the GOP increases, and smooth reproduction becomes difficult if reproduction is based only on the positional information about the first three pictures. Also, even if positional information for all P pictures is known, reading all the P pictures is impractical, because of the low seek speed of an optical disc. In the fourth embodiment, in order to achieve random accessibility, an access point picture is immediately followed by the P pictures necessary for decoding the next access point. The P pictures necessary for decoding access points are not exactly the same as the P pictures necessary for fast-forward reproduction, so smooth fast-forward reproduction cannot be obtained from this arrangement alone, but if the P pictures necessary for fast-forward reproduction are incorporated into in this arrangement, the P pictures in the GOP can be read without repeated seek operations.

In this embodiment, the constraints imposed on the encoding for realizing both random accessibility and fast-forward reproduction are as follows:

1. A picture used as an access point or in fast-forward reproduction must be an I picture or P picture;
2. A P picture used as an access point or in fast-forward reproduction must always be predicted from the initial I picture of the GOP or another P picture, and the pictures necessary for decoding a P picture used as an access point must not include any B pictures;
3. Pictures following a P picture used as an access point must not be predicted or referenced from pictures preceding the access point, other than the initial I picture of the GOP or a P picture used as an access point; and
4. The P pictures necessary for decoding access points and the pictures displayed in fast-forward reproduction must be arranged in continuous succession immediately following an I picture or a P picture used as an access point.

Figure 16:
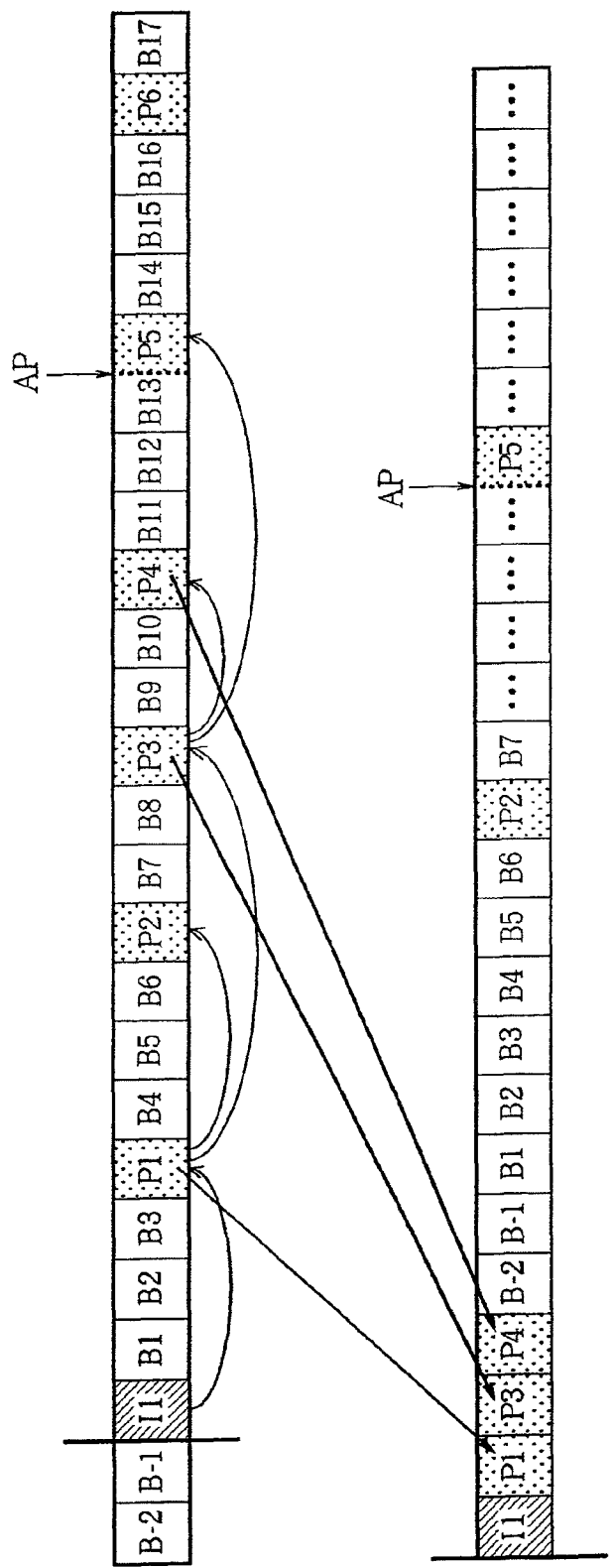
FIG. 16 illustrates the relationship between the picture sequence arranged in presentation order and the sequence rearranged at the time of recording for random access and fast-forward reproduction in a fifth embodiment.

A method of arranging and reproducing data for high quality fast-forward reproduction, obtained by adding improvements to the fourth embodiment, will be described with reference to FIG. 16. FIG. 16 shows the relationship between a sequence of pictures arranged in their display order (upper sequence), and the picture sequence re-arranged for random access and fast-forward reproduction at the time of recording, (lower sequence). It will be assumed that the P pictures necessary for decoding P5 at access point AP are P1 and P3, and the P pictures to be decoded in fast-forward reproduction are P1 and P4. In this case, P1, P3, and P4 follow I1 in continuous succession as shown in the lower sequence. P pictures such as P2, which are used for neither purpose, are not included in this sequence. I1, P1, and P3 are decoded for access to access point AP, while I1, P1, and P4 are decoded in fast-forward reproduction. Since the P pictures to be decoded must be selected according to the purpose, the Entry_map( ) structure described in the above embodiments must be modified. FIG. 17 shows an index information structure modified for random access and fast-forward reproduction.

The italics in FIG. 17 indicate parts that differ from Entry_map( ) in the fourth embodiment; the following description will be limited to these parts. In FIG. 17, number_of_P_picture gives the total number of P pictures necessary for random access and fast-forward reproduction. The following for loop statement is a loop repeated this (number_of_P_picture) number of times. attribute is a flag giving picture attribute information by indicating whether the picture is used in random access and/or fast-forward reproduction, by taking, for example, the value '01' when the picture is used in trick reproduction, the value '10' when the picture is used in random access, and the value '11' when the picture is used in both modes. For example, P1, P3, and P4 in FIG. 16 have attribute values of '11', '10', and '01', respectively. The addition of this type of information indicating whether a picture is necessary in trick reproduction or random access makes it easy to identify the P pictures necessary for random access or fast-forward production. In FIG. 17, the notation [IAP_id][P_id] or [IAP_id][PAP_id][P_id] following attribute indicates that the attribute pertains to the P picture identified by [P_id] in the interval from the I picture access point identified by [IAP_id] to next I picture access point, or to the P picture_identified by [P_id] in the interval from the P picture access point identified by [PAP_id] to the next P picture access point within the range from the I picture access point identified by [IAP_id] to the next I picture access point.

In the fourth embodiment Size_of_IAP and Size_of_PAP gave the total number of sectors necessary for random access, that is, the data size of the pictures necessary for decoding the next access point after a given access point, but in the present embodiment, Size_of_IAP and Size_of_PAP give the total data size (total number of sectors) of the pictures necessary for decoding the next access point after the current access point and the pictures necessary for fast-forward reproduction.

When a user specifies fast-forward reproduction, the transition to fast-forward reproduction occurs at the start of the next GOP. The operation through the reading of the amount of data specified by Size_of_IAP is exactly the same as in random access. The pictures thus read are all decoded, in order to decode from the next access point, but the pictures actually reproduced are only those with attribute flags specifying fast-forward reproduction. When the reading of the amount of data specified by Size_of_IAP is completed, a seek operation is performed to read the amount of data specified by Size_of_PAP from the next P picture access point. Similar operations are repeated until an instruction to stop fast-forward reproduction is received from the user. Smooth fast-forward reproduction is realized by the above operations. The operations during random access are exactly the same except that, based on the attribute values, the pictures necessary for decoding the next access point are selected from among the pictures read according to the data size specified by Size_of_IAP or Size_of_PAP; a description will be omitted. Incidentally, although the preceding description assumes that the decoder 107 in FIG. 4 selects pictures from among the decoded pictures according to the value of attribute, the pictures may be selected by the picture selector 110 shown in the third embodiment before being sent to the decoder 107.

A method of improving image quality in fast-forward reproduction by adding further improvements to the fourth embodiment has been described in the present embodiment, but fast-forward reproduction can also be realized in the third embodiment, in which the pictures do not have to be reordered, by adding an attribute flag indicating whether or not a picture is used in random access and/or fast-forward reproduction, in place of the picture_type item shown in the third embodiment.

As described above, using I pictures and P pictures as access points designated as randomly accessible positions and as pictures necessary for trick reproduction such as fast-forward reproduction enables access points to be designated at reasonable intervals and makes smooth trick reproduction possible, even in low-bit-rate coding systems such as MPEG4-AVC.

When a picture used as an access point or a picture necessary for trick reproduction is a P picture, coding efficiency and high image quality can both be achieved by coding the picture by prediction either from a temporally preceding P picture or from the initial I picture in the GOP.

Furthermore, reproduction following the access point can proceed smoothly because pictures temporally following an I picture or a P picture used as an access point are not coded by prediction from pictures temporally preceding the I picture or the P picture used as the access point, other than the initial I picture in the GOP and other pictures used as access points.

When a P picture in the interior of a GOP is used as an access point or is necessary for trick reproduction, or both, re-arranging the sequence of pictures so that the I picture and any other P pictures used for predictively encoding the P picture, that is, the I and P pictures necessary for decoding the P picture, are bunched together can shorten the access time to the access point.

Storing information on the optical disc or other video information recording medium giving the presentation time, position, and data size of pictures used as access points enables quick reproduction from access points in the interiors of GOPs.

Recording attribute information indicating whether a picture is a picture necessary for decoding of the next access point, a picture necessary for trick reproduction such as fast-forward reproduction, or a picture necessary for both of these purposes permits easy determination of whether a picture is a P picture used in random access or trick reproduction, and facilitates reordering when pictures are reordered during decoding.

As shown in the fourth embodiment, reordering of pictures at the time of decoding is facilitated by the recording of the decoding order of the pictures for each GOP (video unit).

According to the present embodiment, compression efficiency can be improved by increasing the GOP length without compromising image quality, random accessibility, or smooth trick reproduction.

What is claimed is:

1. A video information recording method that records video data comprising a plurality of video units each of which includes an intra coded I-picture, a predictive coded P-picture including a group of blocks predicted from one picture and a bi-directionally-predictive coded B-picture including a group of blocks predicted from two pictures, said method comprising steps of:

coding at least an access point P-picture included in a group of blocks each of which is coded by motion compensation prediction using an I-picture located at the beginning of said video unit including said access point P-picture or a selected one of preceding P-pictures;

coding a P-picture and a B-picture coded by motion compensation prediction using said access point P-picture preceding said P-picture and said B-picture, wherein any P-pictures, other than access point P-pictures, and any B-pictures following said access point P-picture in the same video unit are coded without referring to any picture preceding said access point P-picture;

creating an attribute information including picture type information;

creating an entry point map including positional information and size information of an access point I-picture which is designated as an access point;

recording said video units and said attribute information in a video data recording area; and recording said entry point map in a navigation data recording area.

2. A playback apparatus for reproducing video data recorded on a medium having a video data recording area and a navigation data recording area, said video data comprising a plurality of video units each of which includes an intra coded I-picture, a predictive coded P-picture including a group of blocks predicted from one picture and a bi-directionally-predictive coded B-picture including a group of blocks predicted from two pictures, at least one of said video units including an access point P-picture coded by motion compensation prediction using an I-picture located at the beginning of said video unit or a selected one of preceding P-pictures, wherein any P-pictures, other than access point P-pictures, and any B-pictures following said access point P-picture in the same video unit are coded without referring to any picture preceding said access point P-picture, said medium containing an attribute information in said video data recording area including picture type information specifying a type of each picture included in each of said video units, and an entry point map in said navigation data recording area including positional information and size information of an access point I-picture which is designated as an access point;

said apparatus comprising:

a video unit identifying unit for identifying a video unit which includes a start picture to display, in the case of starting playback from said start picture;

an attribute information reading unit for reading said attribute information to identify an I-picture or a selected preceding P-picture;

a picture accessing unit for accessing said I-picture or said P-picture used for coding said access point P-picture according to said picture type information of said attribute information;

a first decoder for decoding said I-picture or said P-picture used for coding said access point P-picture;

a second decoder for decoding said access point P-picture using decoded I-picture or P-picture; and a reproducing unit for reproducing said start picture using decoded access point P-picture, wherein said start picture is decoded without referring to any picture preceding said access point P-picture.

* * * * *